United States Patent
Coppola et al.

(10) Patent No.: US 11,667,091 B2
(45) Date of Patent: Jun. 6, 2023

(54) METHODS FOR FORMING VASCULAR COMPONENTS

(71) Applicant: GM GLOBAL TECHNOLOGY OPERATIONS LLC, Detroit, MI (US)

(72) Inventors: Anthony M. Coppola, Rochester Hills, MI (US); Nicole Ellison, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 648 days.

(21) Appl. No.: 16/701,693

(22) Filed: Dec. 3, 2019

(65) Prior Publication Data
US 2021/0162688 A1  Jun. 3, 2021

(51) Int. Cl.
*B29C 70/66* (2006.01)
*B29C 70/02* (2006.01)

(52) U.S. Cl.
CPC .......... *B29C 70/66* (2013.01); *B29C 70/025* (2013.01)

(58) Field of Classification Search
CPC ........ B81C 2201/0108; B81C 1/00476; B81C 1/00912; B81C 2201/0105; B81C 2201/0109; B81C 2201/0107; B81C 2201/117; B29C 70/66; B29C 70/025; B29C 33/76; B29C 33/52; B29C 39/10; B22D 19/00; B29B 11/14
See application file for complete search history.

(56) References Cited

U.S. PATENT DOCUMENTS

| 5,912,069 | A | * | 6/1999 | Yializis | ............ B32B 15/08 428/411.1 |
| 10,155,547 | B1 | | 12/2018 | Coppola et al. | |
| 2017/0106605 | A1 | | 4/2017 | Ng et al. | |

(Continued)

FOREIGN PATENT DOCUMENTS

DE     102018130561 A1    6/2019

OTHER PUBLICATIONS

GM Global Technology Operations; U.S. Appl. No. 15/981,190, filed May 16, 2018.

(Continued)

*Primary Examiner* — S. Behrooz Ghorishi
(74) *Attorney, Agent, or Firm* — Quinn IP Law

(57) ABSTRACT

Methods for forming vascular components include providing a composite sacrificial body comprising a first sacrificial material having an outer surface and a second sacrificial material applied to at least a portion of the outer surface, molding a solid substrate around the composite sacrificial body, removing the first sacrificial material by deflagration such that at least a portion of the second sacrificial material remains in the same orientation relative to the substrate as originally molded, and subsequently removing the second sacrificial material by a non-deflagration process to form a vascular component. The second sacrificial material can include a phase change material, a syntactic foam including hollow beads bound together with a polymeric binder or a sintered aggregation of hollow beads, a polymeric foam, a water-soluble resin, or an aerogel. The non-deflagration process can include mechanical pulverization, contacting the second sacrificial material with a solvent or chemical etching agent.

19 Claims, 1 Drawing Sheet

(56) References Cited

U.S. PATENT DOCUMENTS

2018/0029316 A1* 2/2018 Coppola ............... B29C 70/682
2019/0168473 A1 6/2019 Ellison et al.

OTHER PUBLICATIONS

GM Global Technology Operations; U.S. Appl. No. 15/989,988, filed May 25, 2018.
GM Global Technology Operations; U.S. Appl. No. 16/533,176, filed Aug. 6, 2019.

* cited by examiner

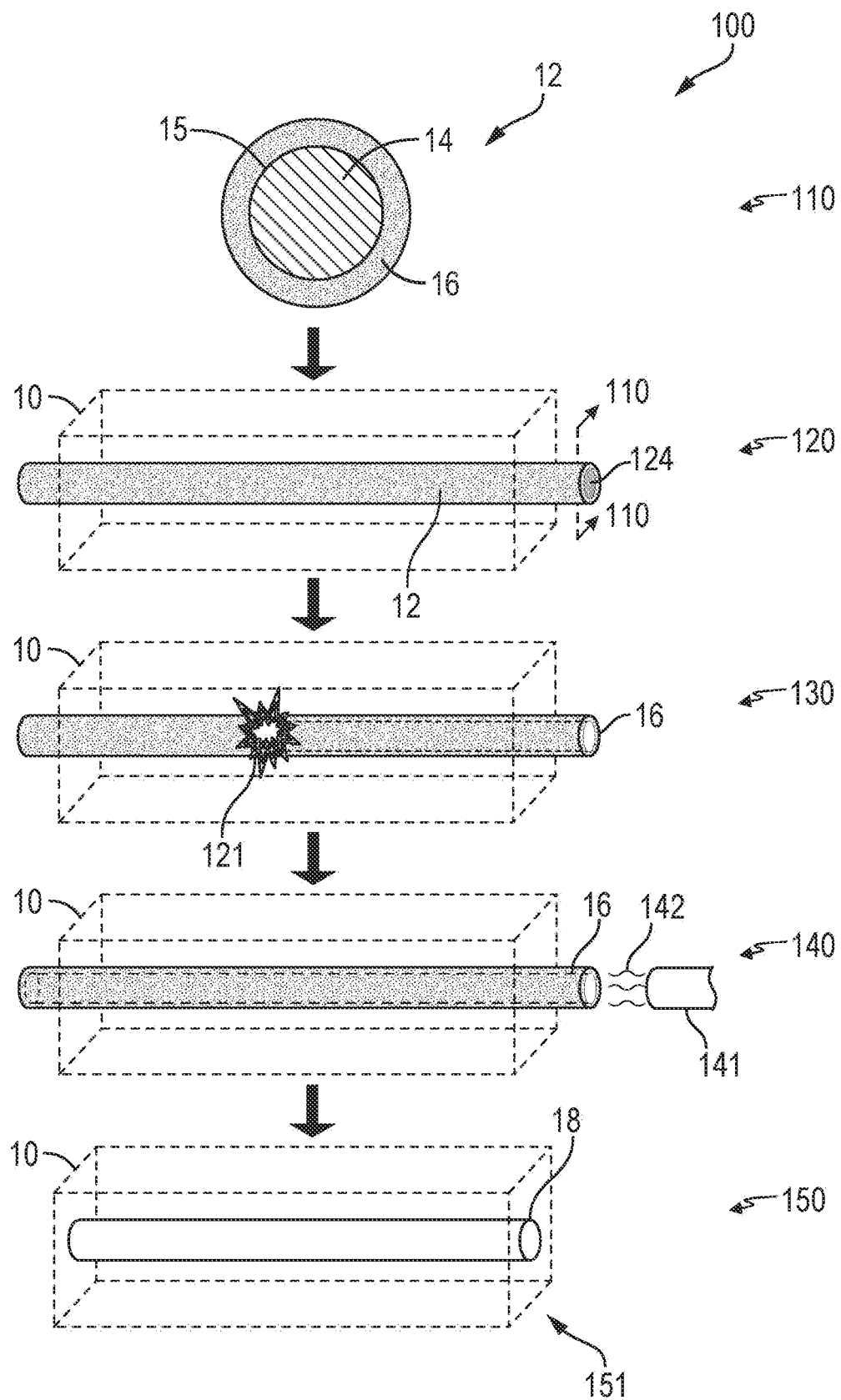

METHODS FOR FORMING VASCULAR COMPONENTS

BACKGROUND

The present disclosure relates to vascular channel manufacture by deflagration. For instance, the presently disclosed method can be used for forming channels within polymers, metals, or composites using deflagration of a sacrificial material. Vascular channel manufacturing in composite materials is often challenging and slow. Previously used sacrificial materials were difficult to remove consistently. For example, the melting and/or vaporizing has been used to remove sacrificial material. However, vaporization (i.e., thermal depolymerization) and melting removal methods can be slow and tend to leave residual material in the channels. Residual materials in turn restrict fluid flow. Deflagration is a rapid process and material left behind is easily removed. Also, the deflagration process described herein does not require the entire composite to be heated, unlike melting and vaporization. Heat generated through deflagration is rapidly dissipated to minimize thermal effects to the polymer composite (or another substrate).

SUMMARY

Methods for forming a vascular component are disclosed and include providing a composite sacrificial body comprising a first sacrificial material having an outer surface and a second sacrificial material applied to at least a portion of the outer surface, molding a solid substrate around the composite sacrificial body, removing the first sacrificial material by deflagration such that at least a portion of the second sacrificial material remains in the same orientation relative to the substrate as originally molded, and subsequently removing the second sacrificial material by a non-deflagration process to form a vascular component. The first sacrificial material can include one or more of black single base gun powders, double base gun powders, and triple base gun powders. The first sacrificial material can further include one or more non-combustible filler materials. The first sacrificial material can further include a polymeric or fibrous protective shell. The first sacrificial material can include one or more polymers with nitroester, nitro, azido, and/or nitramine functional groups. The first sacrificial material comprises one or more oxidizing agents imbedded in a polymeric matrix, wherein the oxidizing agents include one or more chlorates, perchlorates, nitrates, dichromates, nitramides, and/or sulfates. The first sacrificial material can further include one or more unoxidized metal powders, flammable gas-filled polymeric bubbles, metallocene and/or metal oxide catalysts, one or more polymers with nitroester, nitro, azido, and/or nitramine functional groups, one or more burn rate suppressants, non-combustible fillers, and combinations thereof. The second sacrificial material can include a phase change material. The phase change material can include a wax or polymer with a melting point of about 50° C. to about 150° C. The non-deflagration process can include contacting the phase change material with a solvent. The second sacrificial material can be a syntactic foam including hollow beads bound together with a polymeric binder. The non-deflagration process can include contacting the syntactic foam with a solvent. The second sacrificial material can be a syntactic foam including a sintered aggregation of hollow beads or an aerogel. The non-deflagration process can be mechanical pulverization. The second sacrificial material can be a polymeric foam, a water-soluble resin, or an aerogel. The non-deflagration process can include contacting the second sacrificial material with a solvent or chemical etching agent. The solid substrate can be a polymer, polymer composite, or continuous fiber composite material. The vascular component can be an automotive component. The vascular component can be a vascular cooled potted electronic component.

Other objects, advantages and novel features of the exemplary embodiments will become more apparent from the following detailed description of exemplary embodiments and the accompanying drawings.

BRIEF DESCRIPTION OF THE DRAWINGS

FIG. 1 illustrates a method for forming a vascular component, according to one or more embodiments.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 illustrates a method 100 for forming a vascular component 151 using deflagration of a composite sacrificial body 12 within a substrate 10. As used herein, "deflagration" refers to controlled combustion without extreme detonation. Method 100 comprises providing 110 a composite sacrificial body 12 comprising a first sacrificial material 14 having an outer surface 15 and a second sacrificial material 16 applied to at least a portion of the outer surface 15, molding 120 the composite sacrificial body 12 directly into the substrate 10, deflagrating 130 the first sacrificial material 14 of sacrificial component 12 such that at least a portion of the second sacrificial material 16 remains in the same orientation relative to the substrate 10 as originally molded 120, and subsequently removing 140 the second sacrificial material 16 by a non-deflagration process to form 150 a vascular component 151. The vascular component 151 comprises at least one channel 18 as defined by the geometry of the composite sacrificial body 12. The composite sacrificial body 12 can be cylindrical in order to form the channel 18 with a cylindrical cross section, or can have other cross-sectional shapes, such as triangular, elliptical, square, etc. as desired. The composite sacrificial body 12 can have an unbranched or networked geometry to define the geometry of the desired resulting channel(s) 18. FIG. 1 illustrates a specific example of removing 140 the second sacrificial material 16 by introducing a fluid 142 via a fluid source 141 into the channel 18 to remove the second sacrificial material 16, but, as will be discussed below, method 100 is not intended to be limited thereby.

Molding 120 generally comprises disposing the sacrificial component in a mold, filling the mold with liquid or uncured material (e.g., polymeric resin, uncured composite materials such as carbon fiber), and curing the material to form the substrate 10. Molding 120 the composite sacrificial body 12 directly into the substrate 10 can comprise partially molding 120 the composite sacrificial body 12 directly into the substrate 10 such that at least a portion of the composite sacrificial body 12 is disposed outside of the substrate 10 to provide an ignition location (e.g., at exposed surface 124 of the first sacrificial material 14). The substrate 10 can partially or wholly comprise a polymer, a polymer composite, or a continuous fiber composite material (e.g., carbon fiber, fiber glass), among others.

Deflagration 130 can be started by igniting (e.g., using a flame, heat, or combustion inciter) the first sacrificial material 14 (e.g., exposed surface 124), and converts the solid first sacrificial material 14 into gaseous and fine powder byproducts, leaving behind all, or a portion of the second sacrificial material 16 of the sacrificial composite body 12. Accordingly, an inner surface of channel 18 remains substantially coated with the second sacrificial material after deflagration 130. Method 100 is particularly advantageous for forming channels 18 in substrates 10 which are heat sensitive (e.g., electronics), because the second sacrificial material 16 protects the substrate 10 by thermally insulating and physically shielding the same from the deflagrating 130 first sacrificial component. The composite sacrificial body 12 is utilized particularly in the formation of large (e.g., 5 cm-100 cm) or high length/width aspect ratio (e.g., >10) channels and/or small diameter (e.g., 0.5 mm-10 mm) or low length/width aspect ratio (e.g., <10) channels 18 from which removal of a sacrificial body substantially comprising the second sacrificial material 16 by a non-deflagration process would not be practicable.

For example, method 100 can be used to manufacture vascular cooled potted electronics, an engine control unit or touch screen on an instrument, biomedical implants, battery enclosures and cooling fins, and vascular engines and motors, among others. Method 100 can be used to manufacture automotive and non-automotive components such as intake ports in polymer composite engine head assemblies, engine block water jackets, transmission casing oil galleries, composite chassis comprising localized hollow sections, polymer composite structural members comprising undercut sections, and composite (e.g., carbon fiber) suspension arms and bicycle frames.

The composition of the first sacrificial material 14 allows for rapid deflagration 130 but not extreme detonation which would damage the substrate 10. The heat generated during deflagration is dissipated rapidly enough to prevent damage to the substrate 10 and/or unsuitable degradation of the second sacrificial material 16. Ideally, the deflagration 130 products are easy to remove, such as fine powdered and large volumes of gaseous species, but the non-deflagration process used to remove 140 the second sacrificial material 16 can additionally serve to remove the deflagration products 130. The first sacrificial material 14 is further self-oxidizing to burn in a small diameter along long channels, resistant to molding 120 pressures, shelf stable, and stable during manufacturing (i.e., the ignition temperature is greater than the manufacturing or processing temperature). The term "ignition temperature" means the lowest temperature at which body of a combustible material (e.g., the first sacrificial material 14) will ignite, when given an ignition 121 source.

The composite sacrificial body 12 can be molded 120 directly to the substrate 10 at a processing temperature that is less than the flash point of the first sacrificial material 14 to avoid deflagration 130 during the manufacturing process. However, in some embodiments, the composite sacrificial body 12 can be molded 120 directly to the substrate 10 at a processing temperature that is greater than the flash point of the first sacrificial material 14 due to the insulating properties of the second sacrificial material 16. The term "processing temperature" means a temperature required to perform a manufacturing operation, such as molding or casting 120. For example, the processing temperature can be the melting temperature of the material forming the substrate 10 (i.e., the melting temperature of the polymeric resin forming the substrate 10).

The composition of the first sacrificial material 14 is tailored to provide a burn characteristic which minimizes heat transfer to the second sacrificial material 16 and substrate 10 during deflagration 130 yet provide a thermal energy sufficient to maintain a suitable burn rate. In some embodiments, the first sacrificial material 14 can comprise one or more of black powder (i.e., a mixture of sulfur, charcoal, and potassium nitrate), single base gun powders (e.g., particulate nitrocellulose), double base gun powders (e.g., nitrocellulose and nitroglycerin), triple base gun powders (e.g., nitrocellulose, nitroglycerin or diethylene glycol dinitrate, and nitroguanidine), and pentaerythritol tetranitrate. In such embodiments, the first sacrificial material 14 can further comprise non-combustible filler materials to tune speed and heat generation. Suitable non-combustible materials include, but are not limited to, glass particles, beads, and/or bubbles formed from glass, ceramic, silica, or calcium carbonate, for example. In such embodiments, the first sacrificial material 14 can further comprise a protective shell forming outer surface 15. The protective shell can comprise a braided polymeric or fibrous material (e.g., glass fiber, aramid fiber, carbon fiber, and/or natural fiber) infused with an infusion material such as a polymer, wax, oil, or a combination thereof. The infused polymer can be, for example, polyimide, polytetrafluoroethylene (PTFE), high-density polyethylene (HDPE), polyphenylene sulfide (PPS), polyphthalamide (PPA), polyamides (PA), polypropylene, nitrocellulose, phenolic, polyester, epoxy, polylactic acid, bismaleimides, silicone, acrylonitrile butadiene styrene, polyethylene, polycarbonate, elastomers, polyurethane, polyvinylidene chloride (PVDC), polyvinyl chloride (PVC), polystyrene (PS) a combination thereof, or any other suitable plastic. Suitable elastomers include, but are not limited to, natural polyisoprene, synthetic polyisoprene, polybutadiene (BR), chloroprene rubber (CR), butyl rubber, styrene-butadiene rubber, nitrile rubber, ethylene propylene rubber, epichlorohydrin rubber (ECO), polyacrylic rubber, fluoro-silicone rubber, perfluoroelastomers, polyether block amides, chlorosulfonated polyethylene, ethylene-vinyl acetate, shellac resin, nitrocellulose lacquer, epoxy resin, alkyd, polyurethane, etc.

In other embodiments, the first sacrificial material 14 can comprise one or more polymers (e.g., polyesters, polyamides, polyurethanes, polyacrylates) with nitroester, nitro, azido, or nitramine functional groups. Some specific examples of energetic binders include glycidyl azide, pentaerythritol tetranitrate, nitrocellulose, pyrocellulose, poly (vinyl nitrate), polynitrophenylene, nitroamine, and poly (phosphzenes).

In other embodiments, the first sacrificial material 14 can comprise one or more oxidizing agents imbedded in a combustible polymeric matrix, and optionally further comprises one or more additives. The polymeric matrix can comprise one or more thermosetting polymers, one or more thermoplastic polymers, and combinations thereof, and acts as a binder for the one or more oxidizing agents and optional additives. The one or more thermosetting polymers can include epoxies, polyurethanes, furans, melamines, polyimides, polyesters, phenolics, polybutadienes, benzoxazines, cyanate esters, vinyl esters, urea-formaldehydes, polyurea, bismaleimides, and elastomers, for example. The one or more thermoplastic polymers can include polypropylenes, polyethylenes, ABS, acrylics, polylactic acids, polybenzimidazole, polycarbonate, polyether sulfone, polyoxymethylene, polyetherether ketone, polyetherimide, polyethylene, polyphenylene oxide, polyphenylene sulfide, polystyrene, and polyvinyl chloride, for example.

The one or more oxidizing agents can comprise chlorates (e.g., potassium chlorate), perchlorates (e.g., ammonium perchlorate, potassium perchlorate), nitrates (e.g., ammonium nitrate, guanidine nitrate, potassium nitrate, strontium nitrate, sodium nitrate, barium nitrate), dichromates (e.g., potassium dichromate, ammonium dichromate), nitramides (e.g., ammonium dinitramide), and sulfates (e.g., strontium sulfate, sodium sulfate, barium sulfate), for example. In some embodiments, the one or oxidizing agents can have a micro-scale average particle size, for example about 1 µm to about 500 µm, or about 10 µm to about 100 µm. For example, the polymeric matrix can comprise about 25 wt. % to about 60 wt. %, or about 15 wt. % to about 40 wt. % of the sacrificial component.

The one or more additives imbedded within the polymeric matrix can include fuels, catalysts, energetic binders, burn rate suppressants, and non-combustible fillers, for example. Fuels can include unoxidized metal powders (e.g., aluminum powder, magnesium powder) and/or flammable gas-filled polymeric bubbles. The unoxidized metal powders can have a micro-scale average particle size (e.g., about 1 µm to about 500 µm, or about 10 µm to about 100 µm). The flammable gas-filled polymeric bubbles can comprise a polymeric shell (e.g., thermoplastic polymers such as polyester, polyurethane, polystyrene, polyvinyl chloride) encasing a flammable gas (e.g., pentane, butane, dichloroethylene, methylpentane).

Catalysts can include one or more metallocenes (e.g., ferrocene, catocene), and metal oxide particles (e.g., iron oxides, copper oxides, chromium oxides, manganese oxides). Energetic binders can include one or more polymers (e.g., polyesters, polyamides, polyurethanes, polyacrylates) with nitroester, nitro, azido, or nitramine functional groups. Some specific examples of energetic binders, as discussed above, include glycidyl azide, pentaerythritol tetranitrate, nitrocellulose, pyrocellulose, poly(vinyl nitrate), polynitrophenylene, nitroamine, and poly(phosphzenes). Burn rate suppressants can include one or more of oxamide, ammonium sulphate, calcium carbonate, calcium phosphate, and ammonium chloride. Non-combustible fillers can also include hollow bubbles, for example bubbles with a glass, ceramic, or high limiting oxygen index polymeric shell. Non-combustible fillers can also include inert particles, such as ceramic (e.g., silica, alumina) or calcium carbonate particles.

In some embodiments the sacrificial component can comprise about 15 wt. % to about 40 wt. % polymeric matrix, about 30 wt. % to about 80 wt. % oxidizing agent, up to about 5 wt. % or up to about 10 wt. % catalyst. Such a sacrificial component 12 can optionally further include one or more of up to about 20 wt. % unoxidized metal powder particles, up to about 40 v. % (i.e., up to about 1 wt. %) flammable gas-filled polymeric bubbles, up to about 50 wt. % inert particles, and up to about 20 wt. % burn rate suppressants.

In general, the second sacrificial material 16 comprises a non-deflagratory thermal insulating material and can be applied to the first sacrificial material 14 using known techniques such as dip coating, paint coating, spray coating, thermal spray coating, or powder coating. Additionally or alternatively, in some embodiments, the composite sacrificial body 12 can be formed in whole or in part using an additive manufacturing process, particularly when a sacrificial component with a complex geometry is required. Accordingly, substrates 10 with channels 18 having complex shapes can be created. The term "additive manufacturing process" refers a process in which a 3D object is built by adding layer-upon-layer of material. 3D printing process is a kind of additive manufacturing process. In the case of 3D printing, a 3D Computer Aided Design (CAD) model, or the like, can read by a computer, and the computer can command a 3D printer to add successive layers of material to create a 3D object that corresponds to the 3D CAD model.

In some embodiments, the second sacrificial material 16 can comprise a phase change material. Phase change materials are tailored to absorb large amounts of heat produced during deflagration 130 as latent heat and therefore not increase or substantially increase in temperature. Suitable phase change materials include waxes and low melting point polymers (e.g., polymers with melting points of about 50° C. to about 150° C.). Phase change materials can be removed 140 by contacting the same with a polar solvent (e.g., introducing a polar solvent into the channel formed by the deflagrated 130 first sacrificial material 14 and generally defined by the outer surface 15 thereof, or otherwise pumping the polar solvent through channel 18). Suitable polar solvents can include hexane, pentane, cyclohexane, benzene, toluene, chlorogorm, and diethyl ether.

In some embodiments, the second sacrificial material 16 can comprise a syntactic foam. Syntactic foams comprise hollow beads of metal, polymer, glass, or ceramic materials sintered together and/or bound together using a polymeric binder. Syntactic foams have low thermal conductivities due to the hollow nature of the beads and, in some cases, the material of the hollow beads. Suitable polymeric binders can include thermosetting polymers and thermoplastic polymers, such as those discussed above. In some embodiments, water soluble polymers (e.g., polyvinyl acetate) and/or polymers which are soluble in alkaline aqueous solutions (e.g., polylactic acid) are particularly suitable polymeric binders. Syntactic foams comprising polymeric binders can be removed 140 by contacting the same with a solvent or chemical etching agent (e.g., introducing a solvent into the channel formed by the deflagrated 130 first sacrificial material 14 and generally defined by the outer surface 15 thereof, or otherwise pumping the solvent through channel 18). Suitable solvents are those which can dissolve the polymeric binder and can include water and alkaline aqueous solutions in some examples. In other examples, etching agents (e.g., nitric acid) can be used to remove 140 the polymeric binders. Syntactic foams comprising a sintered aggregation of hollow beads can be removed 140 by mechanical pulverization. Mechanical pulverization can include pressurizing the channel 18, shaking the substrate 10, introducing ultrasonic pulses into the channel 18, and introducing a high pressure and/or turbulence fluid (e.g., water, air) into the channel 18, among other methods.

In some embodiments, the second sacrificial material 16 can comprise an aerogel. Aerogels are high porosity, low density gels with low thermal conductivities. Aerogels are known in the art and can be derived from silica, carbon, metal oxides, and organic polymers, among other materials. Aerogels can be removed 140 by mechanical pulverization, or by chemical etching (e.g., introducing a chemical etching agent into the channel formed by the deflagrated 130 first sacrificial material 14 and generally defined by the outer surface 15 thereof, or otherwise pumping the etching agent through channel 18) wherein the chemical etching agent chemical dismantles the aerogel structure. For example, an aerogel comprising silica can be chemical etched by contacting the same with buffered hydrofluoric acid or ammonium fluoride. In another example, an aerogel comprising organic material (e.g., phenol formaldehyde, epoxy, or polyurethane) can be chemical etched by contacting the same with aqueous solutions of nitric acid or sulfuric acid and hydrogen peroxide.

In some embodiments, the second sacrificial material 16 can comprise a polymeric foam. Polymeric foams have high porosity and exhibit low thermal conductivities. Polymeric foams can be removed 140 by contacting the same with a solvent or chemical etching agent (e.g., introducing a solvent or chemical etching agent into the channel formed by the deflagrated 130 first sacrificial material 14 and generally defined by the outer surface 15 thereof, or otherwise pumping the etching agent through channel 18) wherein the chemical etching agent depolymerizes or otherwise decomposes the polymeric foam. For example, the polymeric foam can comprise polyvinyl alcohol and/or other water-soluble resins (e.g., polylactic acid, polyvinylpyrrolidone, poly(N-(2-hydroxypropyl)methacrylamide), pectins, xanthan gum, guar gum, or cellulose ethers) and can be removed 140 using an aqueous solvent such as water. In another example, the polymeric foam can comprise polylactic acid and can be removed 140 using an aqueous solution such as sodium hydroxide-based solutions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that cannot be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for forming a vascular component, the method comprising:
   providing a composite sacrificial body comprising a first sacrificial material having an outer surface and a second sacrificial material applied to at least a portion of the outer surface;
   molding a solid substrate around the composite sacrificial body, wherein the second sacrificial material surrounds the first sacrificial material and is disposed between the first sacrificial material and the solid substrate;
   removing the first sacrificial material by deflagration such that at least a portion of the second sacrificial material remains in the same orientation relative to the solid substrate as originally molded; and
   subsequently removing the second sacrificial material by a non-deflagration process to form the vascular component; and
   wherein the second sacrificial material prevents the first sacrificial material from contacting the solid substrate and is configured for thermally insulating and physically shielding the solid substrate from the deflagration of the first sacrificial material.

2. The method of claim 1, wherein the first sacrificial material comprises one or more of black single base gun powders, double base gun powders, and triple base gun powders.

3. The method of claim 2, wherein the first sacrificial material further comprises one or more non-combustible filler materials.

4. The method of claim 1, wherein the first sacrificial material further comprises a polymeric or fibrous protective shell.

5. The method of claim 1, wherein the first sacrificial material comprises one or more polymers with nitroester, nitro, azido, and/or nitramine functional groups.

6. The method of claim 1, wherein the first sacrificial material comprises one or more oxidizing agents imbedded in a polymeric matrix, wherein the oxidizing agents include one or more chlorates, perchlorates, nitrates, dichromates, nitramides, and/or sulfates.

7. The method of claim 6, wherein the first sacrificial material further comprises one or more unoxidized metal powders, flammable gas-filled polymeric bubbles, metallocene and/or metal oxide catalysts, one or more polymers with nitroester, nitro, azido, and/or nitramine functional groups, one or more burn rate suppressants, non-combustible fillers, and combinations thereof.

8. The method of claim 1, wherein the second sacrificial material comprises a phase change material.

9. The method of claim 8, wherein the phase change material comprises a wax or polymer with a melting point of about 50° C. to about 150° C.

10. The method of claim 8, wherein the non-deflagration process includes contacting the phase change material with a solvent.

11. The method of claim 1, wherein the second sacrificial material is a syntactic foam comprising hollow beads bound together with a polymeric binder.

12. The method of claim 11, wherein the non-deflagration process includes contacting the syntactic foam with a solvent.

13. The method of claim 1, wherein the second sacrificial material is a syntactic foam comprising a sintered aggregation of hollow beads or an aerogel.

14. The method of claim 13, wherein the non-deflagration process is mechanical pulverization.

15. The method of claim 1, wherein the second sacrificial material is a polymeric foam, a water-soluble resin, or an aerogel.

16. The method of claim 15, wherein the non-deflagration process includes contacting the second sacrificial material with a solvent or chemical etching agent.

17. The method of claim 1, wherein the solid substrate comprises a metal, polymer, polymer composite, or continuous fiber composite material.

18. The method of claim 1, wherein the vascular component comprises an automotive component.

19. The method of claim 1, wherein the vascular component comprises a vascular cooled potted electronic component.

\* \* \* \* \*